Sept. 26, 1972  KOICHI FUJII ET AL  3,694,170
PROCESS FOR PRODUCTION OF SPHERIDAL GRANULES OR LUMPS
OF ANHYDROUS ALUMINUM CHLORIDE
Filed March 30, 1970  3 Sheets-Sheet 1

INVENTORS:

KOICHI FUJII ET AL
By: Malte & Malte
ATTORNEYS

Sept. 26, 1972   KOICHI FUJII ET AL   3,694,170
PROCESS FOR PRODUCTION OF SPHERIDAL GRANULES OR LUMPS
OF ANHYDROUS ALUMINUM CHLORIDE
Filed March 30, 1970   3 Sheets-Sheet 3

KOICHI FUJII
TOMOO SAKAI
ICHIRO KIKUCHI
INVENTOR

BY
Nolte & Nolte
ATTORNEY

United States Patent Office 3,694,170
Patented Sept. 26, 1972

3,694,170
PROCESS FOR PRODUCTION OF SPHERICAL GRANULES OR LUMPS OF ANHYDROUS ALUMINUM CHLORIDE
Koichi Fujii, Arai, Tomoo Sakai, Takada, and Ichiro Kikuchi, Niigata-ken, Japan, assignors to Nippon Soda Kabushiki Kaisha, Tokyo-to, Japan
Continuation-in-part of application Ser. No. 661,113, Aug. 16, 1967. This application Mar. 30, 1970, Ser. No. 29,328
Int. Cl. B01d 3/08, 9/00; C01f 7/58
U.S. Cl. 23—294
8 Claims

ABSTRACT OF THE DISCLOSURE

A process for the production of spherical pieces of anhydrous aluminum chloride having diameters of more than 1 mm., comprising providing a layer of pieces of solid anhydrous aluminum chloride in a zone, continuously mixing the solid aluminum chloride in the zone, feeding preheated aluminum chloride vapor into the layer and thereby into contact with the subdivided solid aluminum chloride and extracting heat from the zone.

---

This application is a continuation-in-part of copending application Ser. No. 661,113, filed Aug. 16, 1967, now abandoned.

The present invention relates to a continuous process for production of spherical granules or lumps of anhydrous crystalline aluminum chloride having relatively uniform diameters.

Anhydrous aluminum chloride (hereinafter referred to merely as aluminum chloride) has been obtained in a process wherein aluminum chloride vapor is introduced into a condenser to condense on the cooling wall of the condenser as a bed of crystalline aluminum chloride. According to this process, the crystals which grow on the wall reach a hard block, board or plank state and are tightly adhering. Therefore, in order to remove the crystals from the condenser the crystals adhering to the wall are scraped directly or the outside of the wall is subjected to vigorous impact. Thereafter, the blocks of crystals require further breaking down to proper size and sieving to obtain aluminum chloride crystals of uniform grain size as the final product. During the troublesome procedure such as scraping, breaking down and sieving, aluminum chloride absorbs moisture from the atmosphere and deteriorates through hydroylsis.

A process in which aluminum chloride vapor is cooled in a condenser by contacting it with cold air also appears in the prior art. However, in that process, only a fine crystalline powder is continuously made and granules or lumps having diameters of more than 1 mm. are never produced. Consequently, the above processes are not desirable industrial methods from the point of view of efficiency or purity of product. Furthermore, the products are fine powder or lumps having various shapes. Spherical granules or lumps of uniform diameter are never obtained by the known processes.

It is an object of this invention to provide a process continuously to produce spherical granules or lumps of crystalline aluminum chloride in high yield having a relatively uniform diameter of a desired magnitude. It is another object of this invention to overcome all of the aforementioned defects and disadvantages of the prior art processes.

The present invention involves a process for producing spherical granules or lumps of aluminum chloride having a desired uniform diameter, in which aluminum chloride gas is introduced into a layer of powdered crystalline aluminum chloride or growing granules or lumps of crystalline aluminum chloride in a zone which is cooled and in which the crystalline aluminum chloride is mixed, agitated, tumbled, swirled or otherwise moved (all of these conditions hereinafter generically being referred to as "mixing").

The invention will now be further described by reference to the drawings, in which.

Figure 1:
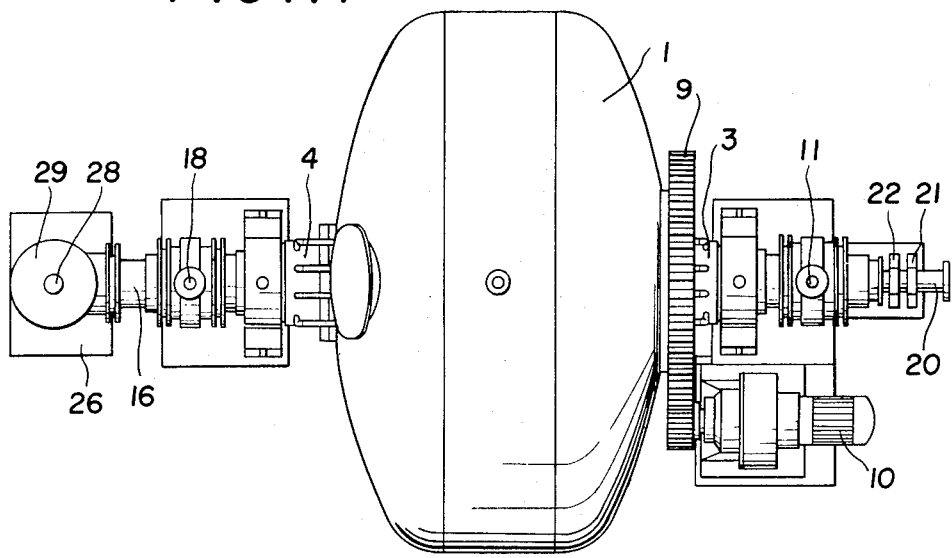
FIG. 1 is a plan view of an apparatus suitable for carrying out the process of the invention.
Figure 2:
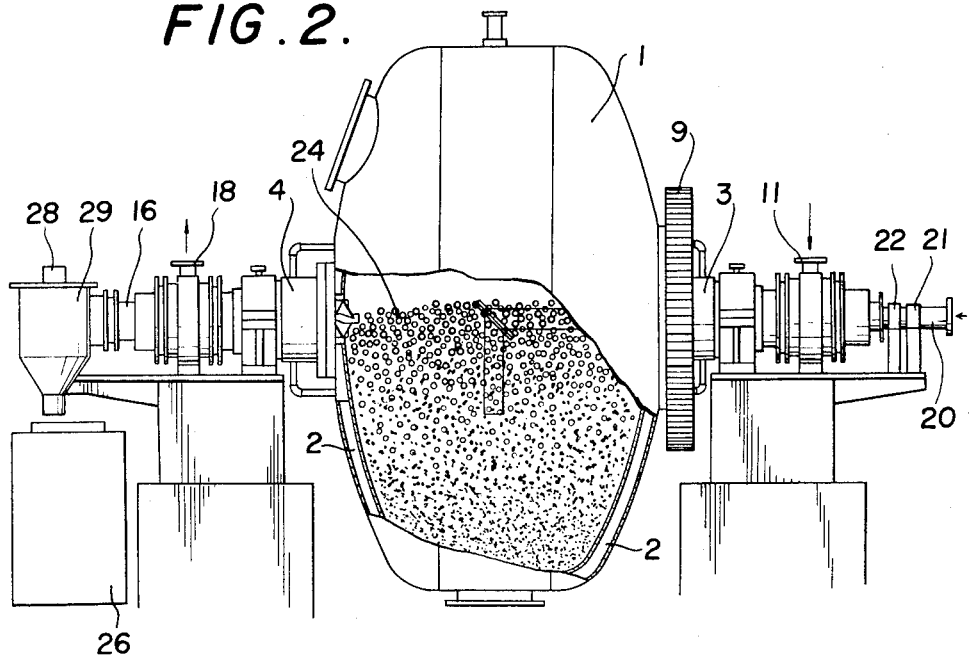
FIG. 2 is a partly broken away side elevation of the apparatus of FIG. 1.
Figure 3:
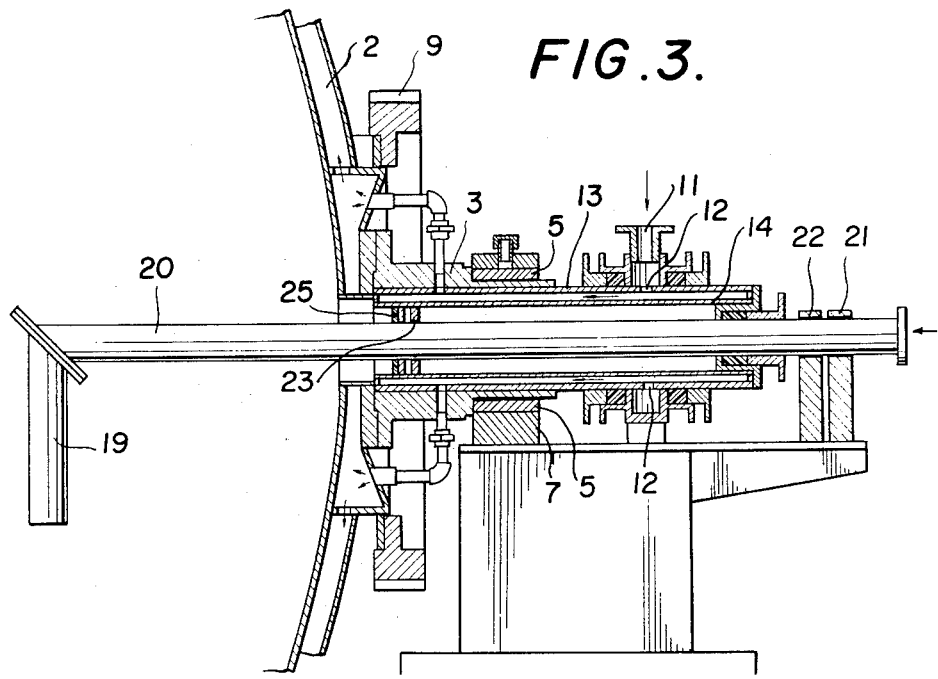
FIG. 3 is a side elevation, partly in section, taken on the right-hand portion of section line A—A of FIG. 1.
Figure 4:
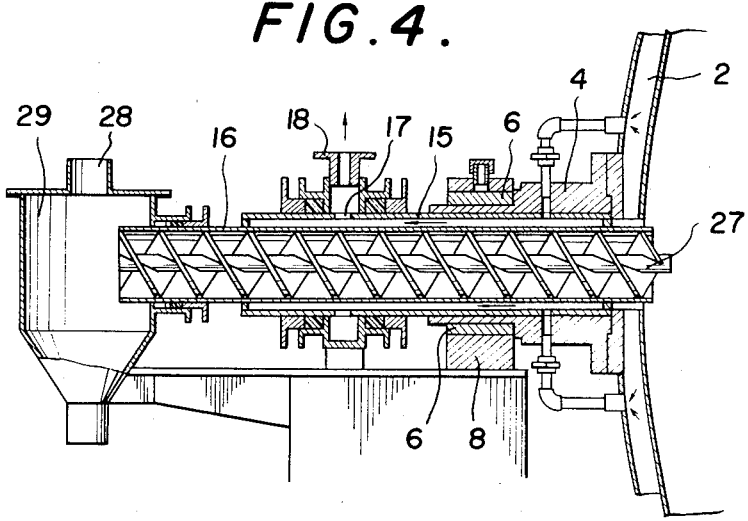
FIG. 4 is a side elevation, partly in section, taken on the left-hand portion of section line A—A of FIG. 1.

In accordance with the process of the invention, an appropriate amount of aluminum chloride powder, granules, lumps or a mixture thereof is charged continuously into a rotary drum or cylinder 1 (FIGS. 1 to 4) or 50 (FIG. 5) the interior of which is indirectly cooled and which is slowly rotated to mix the charged materials. Aluminum chloride vapor is introduced into the layer of subdivided solid aluminum chloride at an appropriate rate and diffuses on the surface of each piece of solid aluminum chloride. Most of the vapor is consumed for growing these crystals and a small proportion is used for the formation of new crystal nuclei. The granules or lumps grow uniformly in crystalline form by deposition or absorption of aluminum chloride from the vapor. Due to the rotatory motion of the container, the solid pieces of aluminum chloride arrange themselves in approximate order of size with the smaller pieces being arranged on the inner surface of the layer relative to the container and the largest pieces being arranged on the outer surface of the layer relative to the container.

Growth of the crystals predominates when the temperature of the surface of the solid pieces of aluminum chloride is in the range of about 85 to about 180° C. The formation of new crystal nuclei predominates when the temperature of the surface of the solid pieces of aluminum chloride is below about 85° C. On the other hand, when the temperature of the surface of the solid pieces of aluminum chloride is above about 120° C. the quantity of free aluminum chloride vapor tends to increase. Formation of new nuclei and growth of the existing nuclei (i.e., solid pieces of aluminum chloride) are adequately balanced at a surface temperature of the pieces of solid aluminum chloride in the range of about 90 to about 110° C.

Usually the walls of the container are cooled to a temperature in the range of about 0 to about 110° C. and preferably about 20 to about 70° C. by maintaining a cooling medium brought into contact with the external face of the walls at this temperature.

The aluminum chloride vapor introduced into the rotary drum or cylinder is generally preheated to a temperature above the temperature which is desired for the surface of the solid pieces of aluminum chloride. Hence, at start-up the pieces of aluminum chloride which first come into direct contact with the aluminum chloride vapor are heated to a surface temperature above the desired surface temperature. However, crystalline aluminum chloride has a relatively high thermal conductivity and, accordingly, the surface temperature of the pieces of aluminum chloride quickly averages out to the desired level. The average surface temperature of the pieces of aluminum chloride is controlled by controlling the temperature at which the aluminum chloride vapor is introduced, the rate at which the aluminum chloride vapor is introduced, the temperature of the cooling medium, the area of the cooling wall and the distribution and grain size of the pieces of aluminum chloride.

By thus regulating the surface temperature of the pieces of aluminum chloride in the range indicated above, nearly all of the aluminum chloride vapor introduced is consumed in the formation and growth of the desired pieces of aluminum chloride before the vapor reaches the surface of the cooling wall. Accordingly, very little formation of solid aluminum chloride on the cooling wall, which is undesired, occurs. In order to increase the output of subdivided aluminum chloride by increasing the rate of introduction of aluminum chloride vapor, it is necessary simultaneously to enlarge the surface area of the cooling wall and/or to lower the temperature of the cooling medium in order to maintain the optimum temperature on the surface of the pieces of aluminum chloride. In order to increase the capacity it is generally necessary to increase the difference in temperature between the temperature to which the aluminum chloride vapor is preheated and the temperature of the cooling medium. When this difference is too greatly increased, the aluminum chloride vapor may tend to form a fine crystalline powder, which is not desired. Thus, there are practical limitations on the output capacities which may be achieved but these limitations are readily experimentally determinable for the particular size and shape of container involved and the particular cooling system provided therefor.

Referring now in detail to FIGS. 1 to 4, a horizontal axis type of rotary drum 1 including a cooling jacket 2 which surrounds the interior thereof is supported by rotary shafts 3 and 4 and bearings 5 and 6 on pedestals 7 and 8, the drum 1 having mounted thereon a gear 9 which intermeshes with a gear on the output shaft of the motor 10. Cooling water is introduced from a water inlet 11 through slits 12 and a space formed between two concentric pipes 13 and 14 which are fixed inside shaft 3. From the space between the concentric pipes 13 and 14 the water flows through subsidiary pipes to the cooling jacket 2. At the other end of the cooling jacket 2, the cooling water flows out therefrom through like subsidiary pipes into the space formed between two concentric pipes 15 and 16 fixed inside the shaft 4. From there the water passes through slits 17 and out through the water outlet 18.

Aluminum chloride vapor is introduced through gas inlet pipe 20 fixed concentrically by means of supporters 21 and 22. The pipe 20 passes through the inside of the pipe 14 wherein it is supported by a collar bearing 23. The pipe 20 communicates directly with a gas flow pipe 19 which projects into the layer 24 of aluminum chloride pieces. The space between pipes 20 and 14 is sealed by means of a packing 25. Pieces of aluminum chloride which have grown in the rotary drum to the desired size are transported to a receiving vessel 26 by means of a screw conveyor in which a screw 27 is rotated together with the rotary drum by being fixed to the pipe 16 or is rotated independently from the drum by means of a separate drive (not shown). A hopper 29 serves to feed the pieces of aluminum chloride from the screw conveyor to the receiving container 26. The aluminum chloride vapor may be introduced together with an inert gas. In this instance, the hopper 29 may be provided with an outlet 28 for release of the inert gas.

At start-up, cooling water is applied to the cooling jacket and the rotary drum is evacuated and then filled with dry air or dry inert gas such as nitrogen or carbon dioxide. Then pieces of aluminum chloride are charged into the rotary drum in an amount equal to about half or less the volume of the drum. The rotary drum is rotated at a rate of about 1 to about 10 r.p.m. and into the drum is fed hot anhydrous aluminum chloride vapor alone or together with an inert gas (i.e., inert relative to aluminum chloride at the aluminum chloride temperatures prevailing in the drum) such as nitrogen, oxygen, carbon dioxide, carbon monoxide, phosgene, chlorine, ferric chloride vapor, silicon chloride vapor, dry air or the like. When inert gas is employed, it may be employed in a proportion amounting up to about 60% by volume of the total volume of aluminum chloride vapor and inert gas. The aluminum chloride vapor is introduced at a rate preferably of about 10 to about 30 kg. per hour per m.$^3$ of volume of the drum.

Thus, each piece of aluminum chloride grows while the layer of aluminum chloride is mixed and cooled. The volume of the layer increases and the pieces of aluminum chloride having the desired average diameter distribution are conveyed from the interior of the rotary drum by means of the rotating screw to the receiving vessel. The yield of product is near theoretical.

Figure 5:
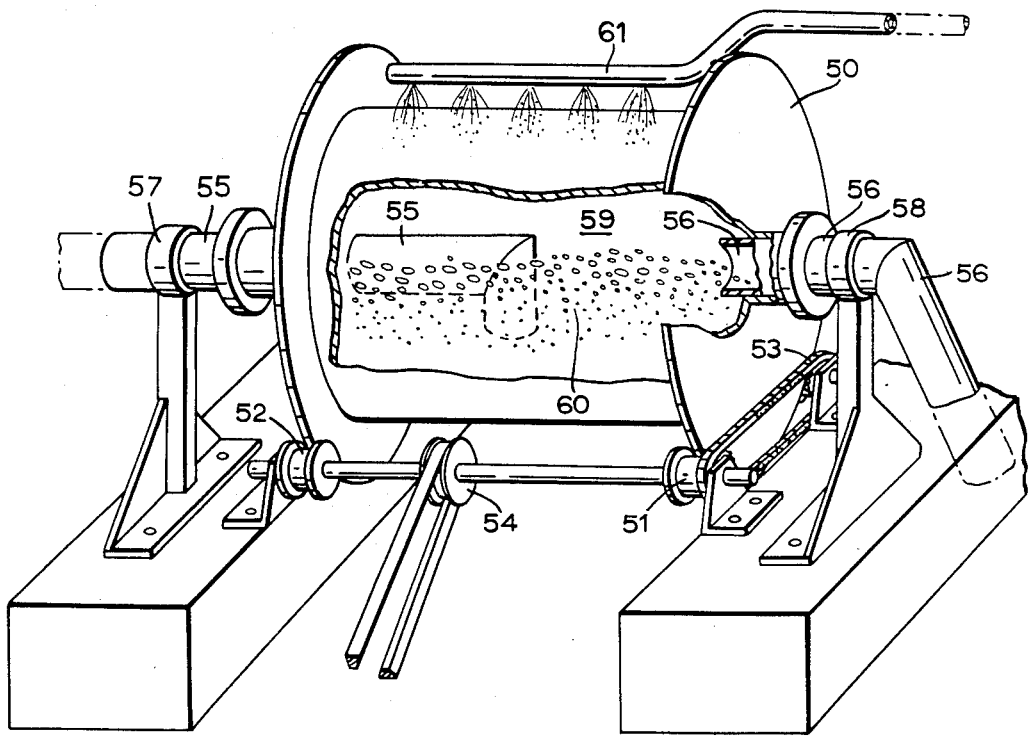
FIG. 5 is a perspective view, partly broken away, of a laboratory apparatus for carrying out the process of the invention.

In FIG. 5 is shown a simpler apparatus for carrying out the method of the invention, as might be employed in a laboratory. The principle of operation is the same. A drum 50 is supported on four rollers, three of which 51, 52 and 53 appear in the drawing. By means of a pulley 54 driven by a belt which in turn is driven by the output shaft of a motor (not shown) the rollers are rotated thereby rotating the drum 50. Fixed to one end of the drum 50 is an inlet pipe 55 rotatably supported by a bearing 57 and fixed to the other end of the drum 50 is an outlet pipe 56 rotatably supported by a bearing 58, pipes 55 and 56 thus serving as the shafts of the drum 50. Inlet pipe 55 bends at right angles and extends downwardly into the layer 60 of pieces of aluminum chloride. A cooling water pipe 61 provided with spray nozzles directs cooling water onto the external surface of the drum 50. In operation, cooling water is sprayed onto the outside of the cylindrical wall of the drum 50 while the drum is rotated at the rate of about 1 to about 10 r.p.m. Hot anhydrous aluminum chloride vapor is introduced into the layer 60 of pieces of aluminum chloride by means of the inlet pipe 55 and the pieces of aluminum chloride which have grown to the desired size overflow through outlet pipe 56.

It is to be understood that the apparatuses described above are to be taken as being illustrative of preferred embodiments. Any type of equipment may be employed insofar as such equipment comprises a device or means to introduce aluminum chloride vapor, to mix pieces of aluminum chloride, to cool and to remove the product. Plural blow pipes or a blow pipe with plural openings may be provided for better distribution of aluminum chloride vapor. Fins may be fitted on the inside of the rotary drum to aid in the mixing. A short pipe having a large diameter may be employed rather than a screw conveyor for removal of the product. Another alternative to a screw conveyor for removal of the product is to slant the apparatus whereby the outlet is inclined downwardly.

The process of the present invention is highly advantageous in that in a single continuous operation there are obtained pieces of pure anhydrous crystalline aluminum chloride having an almost spherical shape, a desirable average grain size and a narrow distribution thereof and this product is obtained in a nearly theoretical yield.

The invention will now still further be described by reference to the following examples:

EXAMPLE 1

Into an apparatus of the type shown in FIGS. 1 to 4 having a rotary drum of internal diameter 2800 mm. and internal length 1600 mm. is charged lumps of aluminum chloride having diameters in the range of 1 to 5 mm. in a quantity filling about half the volume of the drum. The lumps are kept tumbling by rotation of the drum at a rate of about 2 r.p.m. Cooling water is introduced into the cooling jacket and the outlet temperature thereof is regulated at 50 to 60° C. Aluminum chloride vapor at a temperature range of 200 to 250° C. is introduced into the layer of lumps in the drum at a rate of 167 kg. per hour along with 17.5 kg. per hour of nitrogen. After 100 hours of continuous operation, nearly spherical lumps of crystalline chloride 75% of which are in the range of 2 to 8 mm. diameter are obtained at the rate of 167 kg. per hour. After 200 hours of continuous operation, likewise approximately spherical lumps but 76% of which are in the 3 to 15 mm. diameter range are obtained. After 300 hours of continuous operation, the lumps are still approximately spherical but now 69% thereof are in the 4 to 25 mm. diameter range. The purity of the lumps obtained is 99.6 to 99.7% and the yield is 98.5%. Even after 350 hours of continuous operation, aluminum chloride was not found deposited on the inside walls of the drum.

EXAMPLE 2

The apparatus of Example 1 is employed. The lumps initially charged are in the diameter range of 1 to 5 mm. The surface temperature of the lumps is maintained at 95 to 100° C. by adjustment of the cooling water. Aluminum chloride vapor is introduced into the drum at a rate of 171 kg. per hour along with nitrogen gas at a rate of 17.5 kg. per hour and every 50 hours 70 kg. of aluminum chloride powder of 10 to 30 mesh is added as fresh nuclei. Approximately spherical lumps of crystalline aluminum chloride 83% of which are in the diameter range of 1 to 8 mm. are continuously obtained at a rate of 169 kg. per hour. The purity of the product is 99.5 to 99.7% and the yield is 98.2%. There is no significant deposition of aluminum chloride on the internal walls of the drum.

EXAMPLE 3

The apparatus of Example 1 is again employed. Aluminum chloride vapor diluted with dry air at a ratio of 50 liters of air (measured at room temperature and atmospheric pressure) to 1 kg. of aluminum chloride vapor is introduced at the rate of 167 kg. per hour of aluminum chloride vapor into a layer of lumps of aluminum chloride in the drum which lumps have diameters in the range of 3 to 10 mm. The drum is rotated at the rate of 2 r.p.m. and cooled with water at a temperature of 65±2° C. Approximately spherical lumps of aluminum chloride having diameters in the range of 5 to 10 mm. are continuously produced in a quantity of 167 kg. during 150 hours of operation. The purity of the product is 99.5%. In another run, the amount of diluent dry air was increased to a ratio of 168 liters of air to 1 kg. of the aluminum chloride vapor; the yield did not decrease from essentially theoretical.

EXAMPLE 4

The apparatus of Example 1 was again employed. Into the drum lumps of aluminum chloride having diameters in the range of 1 to 5 mm. were charged in a quantity equalling half the volume of the drum. Aluminum chloride vapor at a temperature in the range of 200 to 250° C. is introduced into the drum at a rate of 165 kg. per hour along with nitrogen gas at a rate of 17.5 kg. per hour. The drum is cooled with cooling water at a temperature of 70° C. and is rotated at 2 r.p.m. The surface temperature of the aluminum chloride lumps is maintained at 95 to 100° C. and every 100 hours that temperature is lowered to 80° C. for 30 minutes in order to form fresh nuclei. After continuous operation for 350 hours, 80% of the lumps are in the diameter range of 1 to 8 mm. The purity of the product is 99.5 to 99.7%.

EXAMPLE 5

The apparatus of Example 1 is again employed. Into the drum are charged lumps of aluminum chloride having diameters in the range of 1 to 5 mm. and in a quantity to fill half the volume of the drum. Aluminum chloride vapor is introduced into the drum at a rate of 173 kg. per hour along with nitrogen gas at a rate of 17.5 kg. per hour at 200 to 250° C. The drum is rotated at 2 r.p.m. and the surface temperature of the lumps of aluminum chloride is kept at 95 to 100° C. Every 50 hours, the nitrogen gas is stopped and only aluminum chloride vapor is introduced for 10 minutes. After continuous operation for 300 hours 68% of the lumps are in a diameter range of 1 to 5 mm. The purity is 99.6 to 99.7%.

EXAMPLE 6

Apparatus of the type illustrated in FIG. 5 is employed, the rotary drum of which has an internal diameter of 400 mm. and internal length of 400 mm. Into the drum lumps of crystalline aluminum chloride having diameters in the range of 3 to 10 mm. are charged in a quantity filling about half the volume of the drum. The drum is rotated at 1 r.p.m. Aluminum chloride vapor at a temperature of 200 to 250° C. is fed into the layer of aluminum chloride at the rate of 2.7 kg./hr. through a gas inlet pipe having an inside diameter of 18 mm. The temperature of aluminum chloride lumps at a distance of 5 cm. from the inside wall is maintained at 85 to 90° C. by means of the cooling water. Approximately spherical aluminum chloride crystals of diameters in the range of 3 to 10 mm. are removed from the drum by means of an overflow outlet screw (not illustrated in FIG. 5). After 60 hours of continuous operation, there is no significant formation of aluminum chloride crystals on the internal walls of the drum. Purity of the aluminum chloride product is 99.5 to 99.7% and the yield is almost theoretical.

EXAMPLE 7

Example 6 is repeated except that aluminum chloride vapor is introduced at the rate of 2.4 kg. per hour. After 72 hours of continuous operation, 69% of the aluminum chloride lumps are in the diameter range of 2 to 5 mm. The purity of the aluminum chloride is 99.5 to 99.7% and the yield is almost 100%. There is no significant formation of aluminum chloride on the internal walls of the drum.

What is claimed is:

1. A process for the production of spherical pieces of anhydrous aluminum chloride having diameters of more than 1 mm., comprising providing a layer of substantially only pieces of solid anhydrous aluminum chloride in a rotatable vessel, continuously mixing the solid aluminum chloride by rotating said vessel about a substantially horizontal axis, feeding pre-heated aluminum chloride vapor by way of a gas pipe means extending downwardly into the layer and thereby into contact with the subdivided solid aluminum chloride and extracting heat from the layer by cooling the walls of the vessel to a temperature in the range of about 0 to about 110° C., whereby said mixing is effected primarily by rotating said vessel.

2. A process according to claim 1, in which the surface of the solid aluminum chloride is kept at a temperature in the range of about 90 to about 110° C.

3. A process according to claim 1, further comprising feeding an inert gas to the aluminum chloride.

4. A process according to claim 3, in which the inert gas is selected from the group consisting of ferric chloride, silicon chloride, phosgene, carbon monoxide, carbon dioxide, oxygen, nitrogen and dry air and mixtures thereof.

5. A process according to claim 1, in which the walls of the vessel are cooled to a temperature in the range of about 20 to about 70° C.

6. The process according to claim 7, in which the walls of the vessel are cooled by contacting said walls with water.

7. A process for the production of spherical pieces of anhydrous aluminum chloride having diameters greater than 1 mm., comprising charging a rotatable drum with substantially only subdivided solid anhydrous aluminum chloride, continuously rotating said drum about its horizontal axis whereby said solid aluminum chloride is mixed therein, feeding preheated aluminum chloride vapor into the solid anhydrous aluminum chloride within said drum by way of gas pipe means extending downwardly into said solid anhydrous aluminum chloride whereby said vapor contacts said subdivided aluminum chloride, and extracting heat from said drum by cooling the walls of the vessel to a temperature in the range of about 0 to about 110° C.

8. The process according to claim 7 further comprising removing spherical pieces of anhydrous aluminum chloride formed within the drum from a region at the axis of said drum.

References Cited

UNITED STATES PATENTS

| | | | |
|---|---|---|---|
| 3,485,589 | 12/1969 | Trickey | 23—264 |
| 2,580,635 | 1/1952 | Winter | 23—294 X |
| 1,641,503 | 9/1927 | Prichard | 23—294 X |
| 2,835,554 | 5/1958 | Pardee | 23—93 |
| 2,797,981 | 7/1957 | Tooke | 23—96 |
| 3,457,049 | 7/1969 | Goldberger | 23—294 |
| 3,078,145 | 2/1963 | Gayol | 23—93 |
| 2,583,013 | 1/1952 | Patterson | 23—93 |
| 2,925,145 | 2/1960 | Hayden | 23—294 |
| 1,752,936 | 4/1930 | Austin | 23—93 |

FOREIGN PATENTS

| | | |
|---|---|---|
| 371,875 | 5/1962 | Japan. |
| 847,119 | 9/1960 | Great Britain. |

NORMAN YUDKOFF, Primary Examiner

S. J. EMERY, Assistant Examiner

U.S. Cl. X.R.

23—301 R, 305, 264, 93